United States Patent
Beau

(10) Patent No.: US 7,922,227 B2
(45) Date of Patent: Apr. 12, 2011

(54) SOFT TRIM FOR MOTOR VEHICLE COMPONENT AND RELATED COMPONENT

(75) Inventor: Godefroy Beau, La Garenne Colombes (FR)

(73) Assignee: Faurecia Interieur Industrie, Nanterre (FR)

( * ) Notice: Subject to any disclaimer, the term of this patent is extended or adjusted under 35 U.S.C. 154(b) by 94 days.

(21) Appl. No.: 12/299,970

(22) PCT Filed: Apr. 26, 2007

(86) PCT No.: PCT/FR2007/000713
§ 371 (c)(1),
(2), (4) Date: Feb. 26, 2009

(87) PCT Pub. No.: WO2007/128908
PCT Pub. Date: Nov. 15, 2007

(65) Prior Publication Data
US 2009/0315308 A1 Dec. 24, 2009

(30) Foreign Application Priority Data
May 9, 2006 (FR) ...................................... 06 04098

(51) Int. Cl.
*B62D 25/14* (2006.01)
*B60R 13/02* (2006.01)

(52) U.S. Cl. ... 296/1.08; 296/39.1; 296/70; 296/187.05; 296/153; 280/752

(58) Field of Classification Search .................. 296/39.1, 296/1.08, 214, 70, 187.05, 153; 280/752
See application file for complete search history.

(56) References Cited

U.S. PATENT DOCUMENTS

| 5,318,822 | A | * | 6/1994 | Rhodes | 428/120 |
| 5,806,889 | A | | 9/1998 | Suzuki et al. | |
| 5,853,843 | A | * | 12/1998 | Patel et al. | 428/116 |
| 6,158,771 | A | * | 12/2000 | Nusser et al. | 280/752 |
| 7,291,378 | B2 | * | 11/2007 | Cowelchuk et al. | 428/140 |
| 2003/0070309 | A1 | * | 4/2003 | Brown et al. | 30/535 |
| 2003/0193179 | A1 | | 10/2003 | Yata et al. | |
| 2006/0175858 | A1 | * | 8/2006 | Pegorier et al. | 296/70 |

FOREIGN PATENT DOCUMENTS

| EP | 1130279 | 9/2001 |
| FR | 2869005 | 10/2005 |
| WO | 97/46423 | 12/1997 |

OTHER PUBLICATIONS

International Search Report dated Oct. 4, 2007, in PCT application.

* cited by examiner

Primary Examiner — Dennis H Pedder
(74) Attorney, Agent, or Firm — Young & Thompson

(57) ABSTRACT

The trim (17) comprises a soft outer skin (51). It comprises a plurality of protrusions (53) which are integral with the outer skin (51) and are to rest on a frame (13) for supporting the component (11). Each protrusion (53) extends from an inner face (57) of the skin (51). The protrusions (53) delimit between them spaces (55) for deformation of the trim (17). The ratio of the thickness ($e_p$) of the skin (17), taken orthogonally to the inner face (57), to the thickness ($e_s$) of each protrusion (53), taken along the inner face (57), is greater than 2. The ratio of the thickness ($e_p$) of the skin (17) to the minimum distance ($d_n$) separating each pair of facing protrusions (53A, 53E), taken along the inner surface (57), is greater than 0.3.

7 Claims, 3 Drawing Sheets

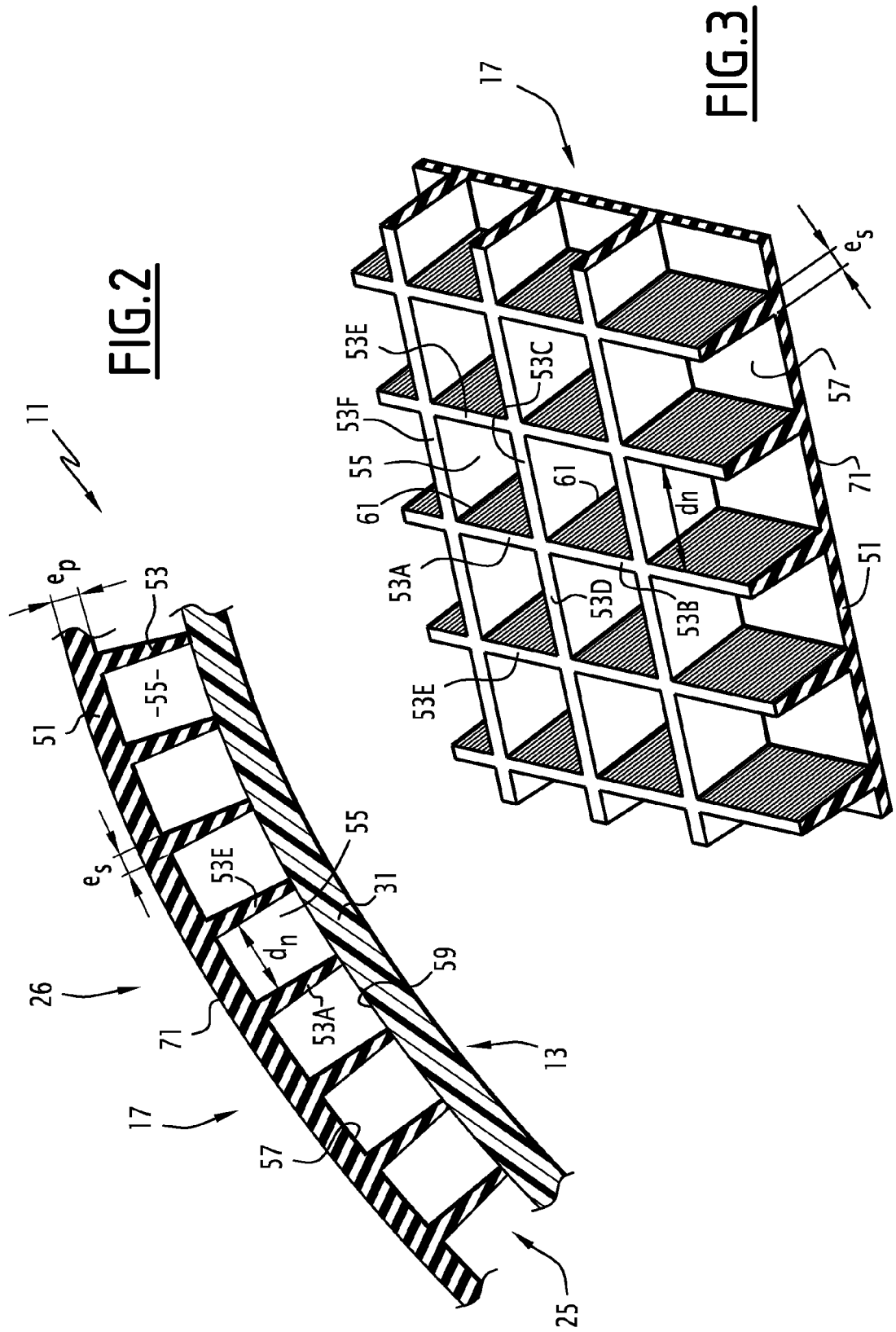

SOFT TRIM FOR MOTOR VEHICLE COMPONENT AND RELATED COMPONENT

The present invention relates to a soft trim for a motor vehicle component, of the type comprising:
- a soft outer skin which defines an outer show face and an inner face; and
- a plurality of protrusions which are integral with the outer skin and are to rest on a frame supporting the component, each protrusion extending from the inner face, the protrusions delimiting between them spaces for deformation of the trim in order to confer thereon its flexibility.

A soft trim of the above-mentioned type is known from FR-A-2 850 077, which trim comprises a soft outer skin which defines an outer show face. The trim comprises a plurality of ribs which are integral with the upper skin and rest on a frame supporting the component. The ribs delimit between them cells for deformation of the trim in order to confer thereon its flexibility.

Such a trim, shown diagrammatically, can in some cases have variable flexibility and have little homogeneity over its entire extent.

It is an object of the invention, therefore, to improve the flexibility of the trim, in a homogeneous manner over its entire extent.

To that end, the invention relates to a trim of the above-mentioned type, wherein the ratio of the thickness of the skin, taken orthogonally to the inner face, to the thickness of each protrusion, taken along the inner face, is greater than 2, and the ratio of the thickness of the skin to the minimum distance separating each pair of opposing protrusions, taken along the inner face, is greater than 0.3.

The trim according to the invention can have one or more of the following characteristics, taken in isolation or according to all technically possible combinations:
- the plurality of protrusions defines a series of adjacent cells, each cell being separated from the adjacent cells by at least one protrusion;
- each protrusion is connected to at least two other protrusions along a common lateral edge;
- the cross-sections of the cells, taken along the inner face of the skin, are substantially identical;
- the thickness of each protrusion decreases along the protrusion away from the skin;
- the skin and the plurality of protrusions are formed of a material having a hardness of from 60 Shore A to 75 Shore A;
- the angle formed by the axis of each protrusion and an axis orthogonal to the directrix surface of the outer skin, taken at the base of the protrusion, is less than 30°; and
- it has a first region having a plurality of protrusions parallel to a first axis, and at least one second region having a plurality of protrusions parallel to a second axis which is inclined relative to the first axis.

The invention relates further to a motor vehicle component comprising a rigid support frame and a trim as defined hereinbefore, the trim covering at least part of an outer face of the support frame.

The invention will be better understood upon reading the following description, which is given solely by way of example and with reference to the accompanying drawings, in which:

FIG. 2 is a partial diagrammatic section, on an enlarged scale, along the plane II-II of FIG. 1;

FIG. 3 is a bottom view, in perspective, of part of the trim of the dashboard of FIG. 1.

Hereinbelow, the orientations are the conventional orientations of a motor vehicle. Accordingly, the terms "upper", "lower", "transverse", "longitudinal", "front", "back", "left", "right" are to be understood relative to the normal direction of travel of a motor vehicle and to the position of a driver.

Figure 1:
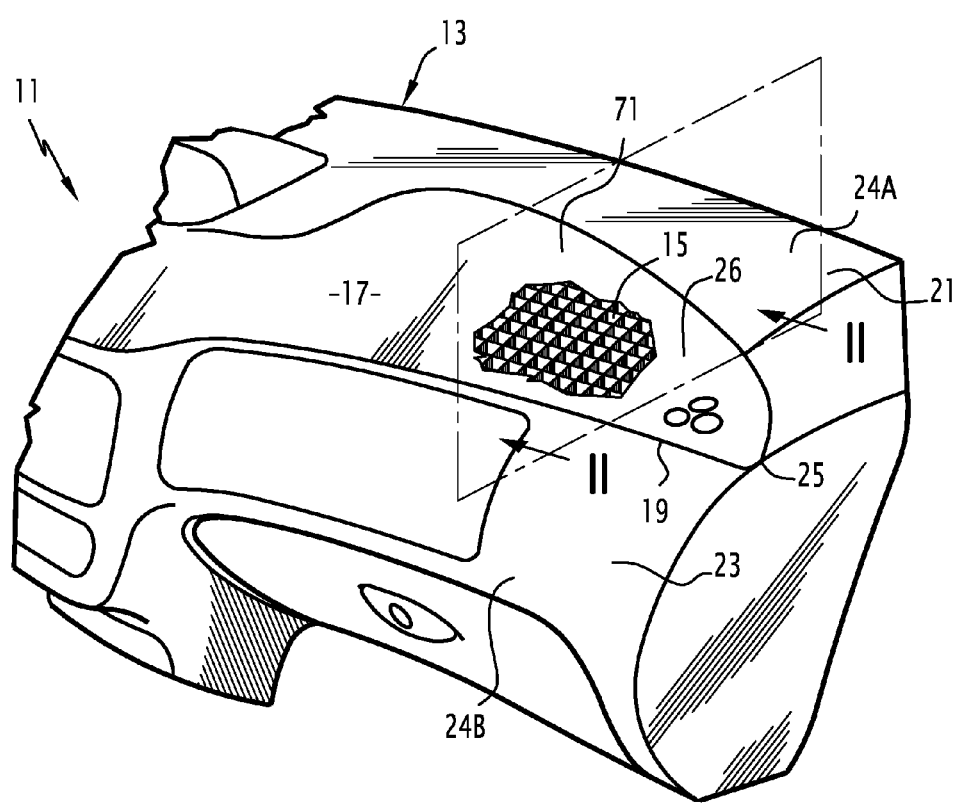
FIG. 1 is a partial diagrammatic view, in perspective, of part of a first dashboard according to the invention.

FIGS. 1 to 3 describe a dashboard 11 according to the invention. The dashboard 11 comprises a rigid support frame 13 which delimits, on the inside, a housing 15, a soft trim 17, and means 19 for the peripheral fixing of the trim 17 to the support 13. In this example, the soft trim 17 closes off the housing 15 completely.

The support frame 13, which is sometimes called an insert, is fixed to the body (not shown) of the motor vehicle in the conventional manner. It is made, for example, of homopolymeric or copolymeric, polyolefinic thermoplastic material optionally comprising mineral fillers or a glass-fibre reinforcement. It can be made of ABS-PC (acrylonitrile butadiene styrene and polycarbonate) optionally reinforced by glass fibres. The rigidity of such materials enables them to fulfil a supporting function.

The support 13 has an upper wall 21 and a lower wall 23, which walls are connected by a hollow region 25 which delimits the housing 15.

The upper and lower walls 21 and 23 are curved. Each wall 21, 23 has an outer face 24A, 24B which delimits part of a show face 26 of the dashboard 11 which is to be located facing an occupant of the vehicle.

As is shown in FIG. 2, the hollow region 25 has a curved bottom 31 which extends parallel to the show face 26 of the dashboard 11.

The soft trim 17 comprises an outer covering skin 51 of substantially constant thickness $e_p$, which is prolonged at the bottom by a series of protruding support ribs 53 which delimit between them a plurality of adjacent cells 55.

The trim 17, and therefore the skin 51 and the ribs 53, are formed of a single piece of plastics material, for example of a thermoplastic elastomer such as thermoplastic polyurethane (TPU) or thermoplastic polyolefin (TPO). It is also possible to use plasticised polyvinyl chloride (PVC) or rubber such as silicone.

The trim 17 is especially more flexible than the support 13. The hardness of the material of which the trim is formed is, for example, from 60 Shore A to 75 Shore A and is preferably substantially 60 Shore A.

The ribs 53 extend from an inner face 57 of the skin 51 to an upper face 59 of the bottom 31, on which they rest. It will be noted that, in this example, the ribs 53 are substantially orthogonal to the directrix surfaces of the bottom 31 and the skin 51.

The thickness of each rib 53, in section according to a vertical plane, decreases along the rib 53 away from the skin 51. The ratio $R_1$ of the thickness $e_p$ of the skin 51, taken orthogonally to the inner face 57, to the thickness $e_s$ of each rib 53, taken at its base along the inner face 57, is greater than 2.

As is shown in FIG. 3, each rib 53A has two lateral edges 61 which extend substantially perpendicularly to the lower face 57 of the skin 51.

Each rib 53A is connected to at least two other ribs 53B, 53C, 53D along each lateral edge 61, over the entire height of the lateral edge 61. In the example shown, each rib 53A is connected along each lateral edge 61 to an adjacent rib 53B which extends substantially in the same plane as the rib 53A. Each rib 53A is additionally connected along the same lateral edge 61 to two ribs 53C, 53D which extend in a plane orthogonal to the plane of the rib 53A, on either side of the plane of the rib 53A.

Each rib 53A extends facing a rib 53E located in a plane substantially parallel to the plane of the rib 53A. The rib 53B is connected to the facing rib 53A by two adjacent ribs 53C, 53F which extend from two opposite lateral edges 61 of the rib 53A.

The rib 53A, the facing rib 53E and the adjacent ribs 53C and 53D accordingly define a cell 55 of substantially square cross-section, taken along the lower face 57 of the skin 51.

Each cell 55 is accordingly separated from an adjacent cell by at least one rib 53. The cross-sections of the cells 55, taken along the lower face 57, are all of identical, substantially square shape, which simplifies the molding of the soft trim 17 according to the invention.

As is shown by the section of FIG. 2, the ratio $R_2$ of the thickness $e_p$ of the skin 51 to the minimum distance $d_n$ separating each pair of facing ribs 53A, 53E, taken along the lower face 57, is greater than 0.3.

The skin 51 has an upper face 71 located opposite the lower face 57. The upper face 71 delimits a portion of the show face 26 of the dashboard 11 that extends between the outer faces 24A, 24B of the upper and lower walls 21 and 23.

The upper face 71 of the skin 51 is flush with each outer face 24A, 24B. The show face 26 of the dashboard is therefore substantially continuous.

The means 19 for fixing the trim 17 to the frame 13 are analogous to those described in French application FR 2 850 077 or in French application no. 05 03 653 of the Applicants and will not be described in greater detail.

Because the trim 17 is made of a soft material and the cells 55 are delimited between the ribs 53, the trim 17 is deformable to the touch.

That deformation can be the result of buckling of the ribs 53 located in the region of the point of application of a pushing force and bending of the region(s) of skin 51 located between the ribs 53. The ribs 53 and the cells 55 thus impart to the trim 17 its flexibility and its thickness, so that satisfactory comfort is obtained.

The combination of a ratio $R_1$ greater than 2 and a ratio $R_2$ greater than 0.3 makes it possible to obtain a flexibility that is comparable with that of a layer of foam, without it being possible to feel the ribs 53 through the skin 51. The flexibility to the touch is therefore homogeneous over the entire outer face 71 of the skin 51.

Figure 4:
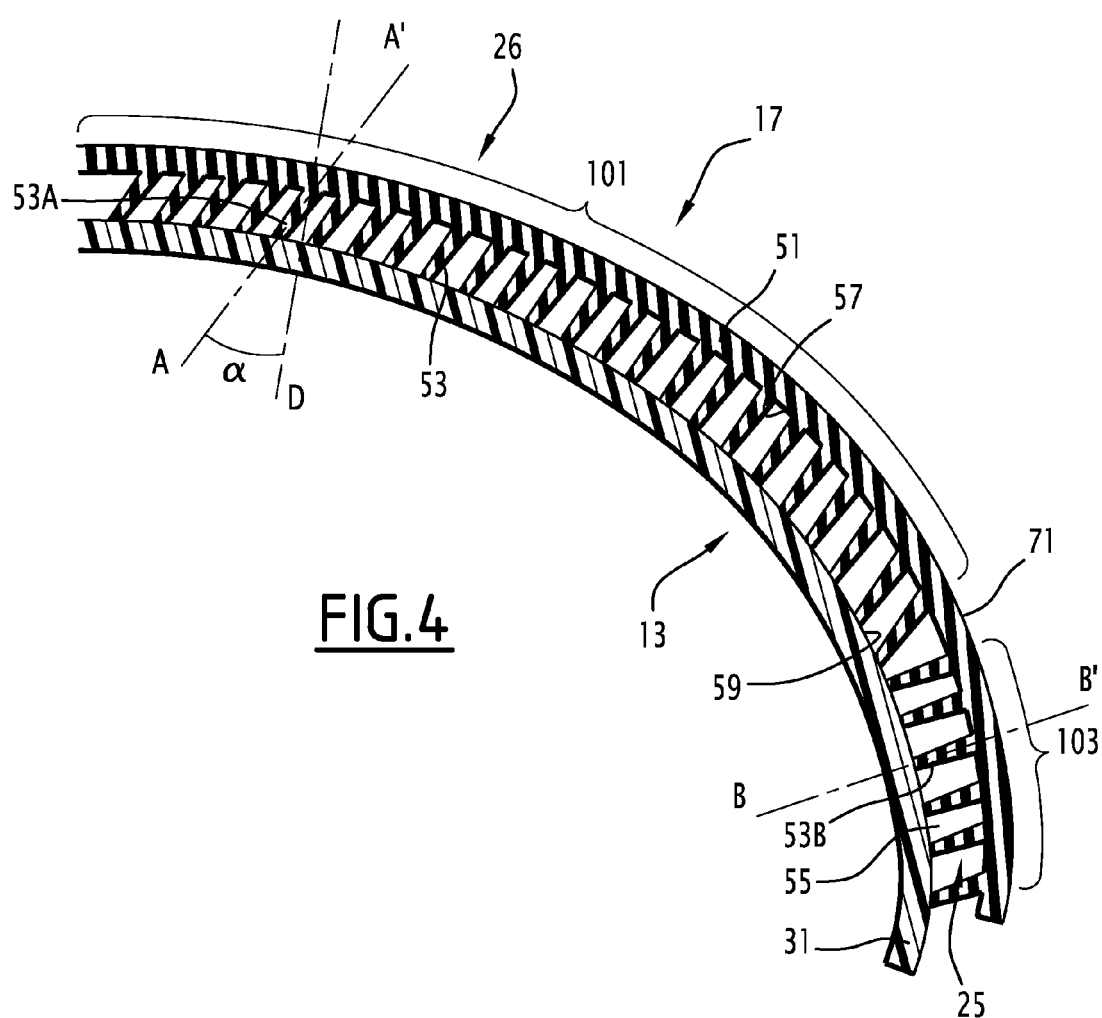
FIG. 4 is a partial diagrammatic section, on an enlarged scale of a variant of FIG. 2, where all the ribs are not orthogonal to the directrix surface of the bottom and of the skin.

In the variant shown in FIG. 4, not all the ribs 53 are orthogonal to the directrix surfaces of the bottom 31 and of the skin 17.

As is shown in FIG. 4, the trim 17 comprises an upper region 101 in which the ribs 53 extend, in section according to a vertical longitudinal plane, parallel to the same axis A-A', and a lower region 103 in which the ribs 53B extend parallel to the same axis B-B', which is inclined relative to the axis A-A'. In each region 101, 103, the maximum angle α formed by the axis of each rib 53 and the direction D orthogonal to a directrix surface of the skin 51 passing through the base of the rib 53A on the skin 51 is less than 30° in order to ensure adequate flexibility of the trim 17. Accordingly, as a function of the curvature of the bottom 31 of the frame 13 on which the ribs 53 rest, the trim 17 has a plurality of regions 101, 103 in which the ribs 53 are all parallel to one another and have an angular displacement of less than 30° relative to the normal to a directrix surface of the skin 51 at the base of each rib.

Preferably, the major axis of the ribs 53, that is to say the axis of the ribs in the region 101 of the trim 17 having the largest number of parallel ribs 53, is substantially parallel to the demolding axis of a mold (not shown) for producing the trim 17.

The mold for producing the trim 17 further comprises at least one complementary block for producing the ribs 53B of axis B-B' inclined relative to the axis A-A'.

The invention claimed is:

1. A soft trim for a motor vehicle component, comprising:
a soft outer skin which defines an outer show face and an inner face; and
a plurality of protrusions which are integral with the outer skin, such that each of the plurality of protrusions and the outer skin are formed of a single piece of the same material, and are to rest on a frame supporting the component, each protrusion extending from the inner face, the protrusions delimiting between them spaces for deformation of the trim in order to confer thereon its flexibility, the trim being deformable to the touch,
wherein the angle formed by the axis of each protrusion and an axis orthogonal to the directrix surface of the outer skin, taken at the base of the protrusion, is less than 30°, and the soft trim has a first region having a plurality of protrusions parallel to a first axis, and at least one second region having a plurality of protrusions parallel to a second axis which is inclined relative to the first axis,
wherein the ratio of the thickness of the skin, taken orthogonally to the inner face, to the thickness of each protrusion, taken along the inner face, is greater than 2, and
wherein the ratio of the thickness of the skin to the minimum distance separating each pair of facing protrusions, taken along the inner face, is greater than 0.3.

2. The trim as claimed in claim 1, wherein the plurality of protrusions defines a series of adjacent cells, each cell being separated from the adjacent cells by at least one protrusion.

3. The trim as claimed in claim 2, wherein each protrusion is connected to at least two other protrusions along a common lateral edge.

4. The trim as claimed in claim 2, wherein the cross-sections of the cells, taken according to the inner face of the skin, are substantially identical.

5. The trim as claimed in claim 1, wherein the thickness of each protrusion decreases along the protrusion away from the skin.

6. The trim as claimed in claim 1, wherein the skin and the plurality of protrusions are formed of a material having a hardness of from 60 Shore A to 75 Shore A.

7. A motor vehicle interior component comprising a rigid support frame and a trim according to claim 1, the trim covering at least part of an outer face of the support frame.

* * * * *